United States Patent
Haneda et al.

(10) Patent No.: US 6,929,185 B2
(45) Date of Patent: Aug. 16, 2005

(54) METHOD OF PRODUCING A HOLOGRAM (76) Inventors: Takuya Haneda, 3-banchi-no-6, Tenjincho, Hachiouji-shi, Tokyo 192-0074 (JP); Shinichiro Nishizawa, 3-3-1, Kagiyama, Iruma-shi, Saitama 358-0004 (JP)

( * ) Notice: Subject to any disclaimer, the term of this patent is extended or adjusted under 35 U.S.C. 154(b) by 120 days.

(21) Appl. No.: 10/332,920
(22) PCT Filed: Apr. 3, 2001
(86) PCT No.: PCT/JP01/02889
  § 371 (c)(1),
  (2), (4) Date: Jan. 13, 2003
(87) PCT Pub. No.: WO02/06059
  PCT Pub. Date: Jan. 24, 2002

(65) Prior Publication Data
  US 2004/0020995 A1 Feb. 5, 2004

(30) Foreign Application Priority Data
  Jul. 14, 2000 (JP) ........ 2000-213978
  Jul. 14, 2000 (JP) ........ 2000-213979

(51) Int. Cl.$^7$ .............. G06K 19/00; G03H 1/04
(52) U.S. Cl. .................... 235/487; 359/35
(58) Field of Search .............. 235/487, 494; 359/1–35

(56) References Cited

U.S. PATENT DOCUMENTS 4,592,893 A * 6/1986 Poppe et al. ............. 422/56
5,504,594 A * 4/1996 Yamazaki ............... 359/2

FOREIGN PATENT DOCUMENTS

| JP | S47-27423 | 10/1972 | |
| JP | 64-023274 | 1/1989 | ............ G03H/1/20 |
| JP | H03-071383 | 3/1991 | ............ G06K/19/10 |
| JP | H03-071384 | 3/1991 | ............ G06K/19/10 |
| JP | H06-004694 | 1/1994 | ............ G06K/1/12 |
| JP | H09-027018 | 1/1997 | ............ G06K/17/00 |
| JP | H10-320615 | 12/1998 | ............ G07F/7/08 |
| JP | 2000-020806 | 1/2000 | ............ G07F/9/00 |

* cited by examiner

Primary Examiner—Karl D. Frech
Assistant Examiner—Jamara A. Franklin
(74) Attorney, Agent, or Firm—Pendorf & Cutliff (57) ABSTRACT

A method of producing, by one hologram original plate, hologram tape accommodating a huge number of prepaid cards having mutually different specific codes. The method of producing a hologram comprises the steps of forming an oblong two-dimensional image having random numbers in a bar-code form, preparing a hologram original image based on the two-dimensional image, winding the hologram original image around the surface of a drum(110), preparing a drum-like hologram original plate(101) having minute irregularities corresponding fringes formed on the surface of the drum(110) by an etching technique, rotating the original plate(101) on the surface of a blank sheet(120) to repeatedly transfer the minute irregular hologram original image(111) on the surface of the original plate(101) onto the blank sheet(120), cutting the original image(111)-transferred blank sheet(120) into specified lengths, cutting the blank sheet (120) into length that does not exactly divide a circumferential length of the original plate(101).

3 Claims, 11 Drawing Sheets

| Sales data | |
|---|---|
| Publishing date | 06301030 |
| Published value | 5000 |
| Publishing shop number | a |
| Card number | 001 |

(b)

| Use data | |
|---|---|
| Date of use | 06301040 |
| Paid amount | 500 |
| Publishing shop number | a |
| Card number | 001 |
| ( Management shop number | a ) |

Fig.10

| Card data | |
|---|---|
| Publishing shop number | a |
| Publishing date | 06301030 |
| Published value | 5000 |
| Balance | 5000 (4500, 3000) |
| Card number | 001 |
| (Managing shop number | a) |

Fig.11

| Card use history |
|---|
| Sales data |
| Publishing date     06301030
Publishing value         5000
Publishing shop number    a
Card number              001 |
| Use data |
| Date of use         06301040
Paid amount              500
Publishing shop number    a
Card number              001
( Manageing shop number    a) |
| Publishing shop number    a
Card number              001
Date of use         06301100
Paid amount              500
  ( Managing shop number    a) |
| Publishing shop number    a
Card number              001
Date of use         06301140
Paid amount             1000
( Managing shop number    b) |

METHOD OF PRODUCING A HOLOGRAM

CROSS REFERENCE TO RELATED APPLICATIONS

This application is a national stage of PCT/JP01/02889 filed Apr. 3, 2001, and based upon Japanese application nos. 2000-213978 filed Jul. 14, 2000, and 2000-213989 filed Jul. 14, 2000, under the International Convention.

BACKGROUND OF THE INVENTION

1. Field of the Invention

The present invention relates to a card having a money payment function, which is called, for example, a telephone card, a prepaid card, or the like, and to a method of recording its money consumption. Further, the present invention relates to a method of producing a hologram tape having a characteristic code. Further, the present invention relates to a method of managing prepaid cards, and in particular to a method of managing prepaid cards, in which a shop computer reads the newest card data of a prepaid card that accesses the computer, and inherits a card use history of that prepaid card stored in a storage unit of a computer of the last managing shop that has managed that prepaid card.

2. Description of the Related Art

A conventionally used card having a money payment function generally employs a magnetic recording system for recording information. One reason for employing the magnetic recording system lies in that a reader can be provided cheaply, and the system can be simply introduced into a vending machine, or the like.

On the other hand, it is inconvenient that a simpler device can decode the magnetic recording system. As a result, forgery of a card having a money payment function is rampant, causing a great loss to a card issuer.

To avoid such inconvenience, there has been proposed an idea that an optical identification member (for example, a hologram or a diffraction grating) having a specific reflection characteristic that can not be forged is provided in a card, this identification member is read by an optical reader to examine its authenticity, and sales of an article or ticket is carried out when the card is valid, as disclosed by Japanese Unexamined Patent Laid-open Nos. 3-71383 and 3-71384, for example.

It is said that preparation itself of an identification member utilizing a hologram or a diffraction grating is difficult. Further, even if it can be forged, a very large-scale or precious apparatus is required, which is quite disadvantageous from the viewpoint of costs. Thus, owing to this point, it is said that forgery of such identification member is more difficult than the magnetic recording system.

As described above, forgery of a card can be prevented by using an optical identification member. However, even if forgery of a card can be prevented, rewriting of information can be carried out simply, when the information is still recorded by the magnetic recording system. Namely, it can be considered that, by making a punched hole in a magnetic stripe in which the information is written, the information is destroyed and at the same time the magnetic stripe itself is damaged. When a new magnetic stripe is stuck on a magnetic stripe formed with a punched hole, information can be rewritten.

An object of the present invention is to provide a card having a money payment function and a method of recording money consumption that can solve the above-mentioned problems.

On the other hand, under the present conditions, forgery and alteration of a prepaid card are rampant without being exterminated. Now, a dozen or so years has passed from practicing of adding a hologram to a prepaid card to use as a hologram characteristic code. When a hologram is stuck to a prepaid card once, it is impossible to peel it off without damaging it, and its forgery and alteration are very difficult. As a result, forgery and alteration of a prepaid card added with a hologram are almost impossible. Further, automatic reading of a hologram is easy, similarly to a magnetically prepared characteristic code, and information management and handling of each prepaid card can be easily carried out.

Figure 6:
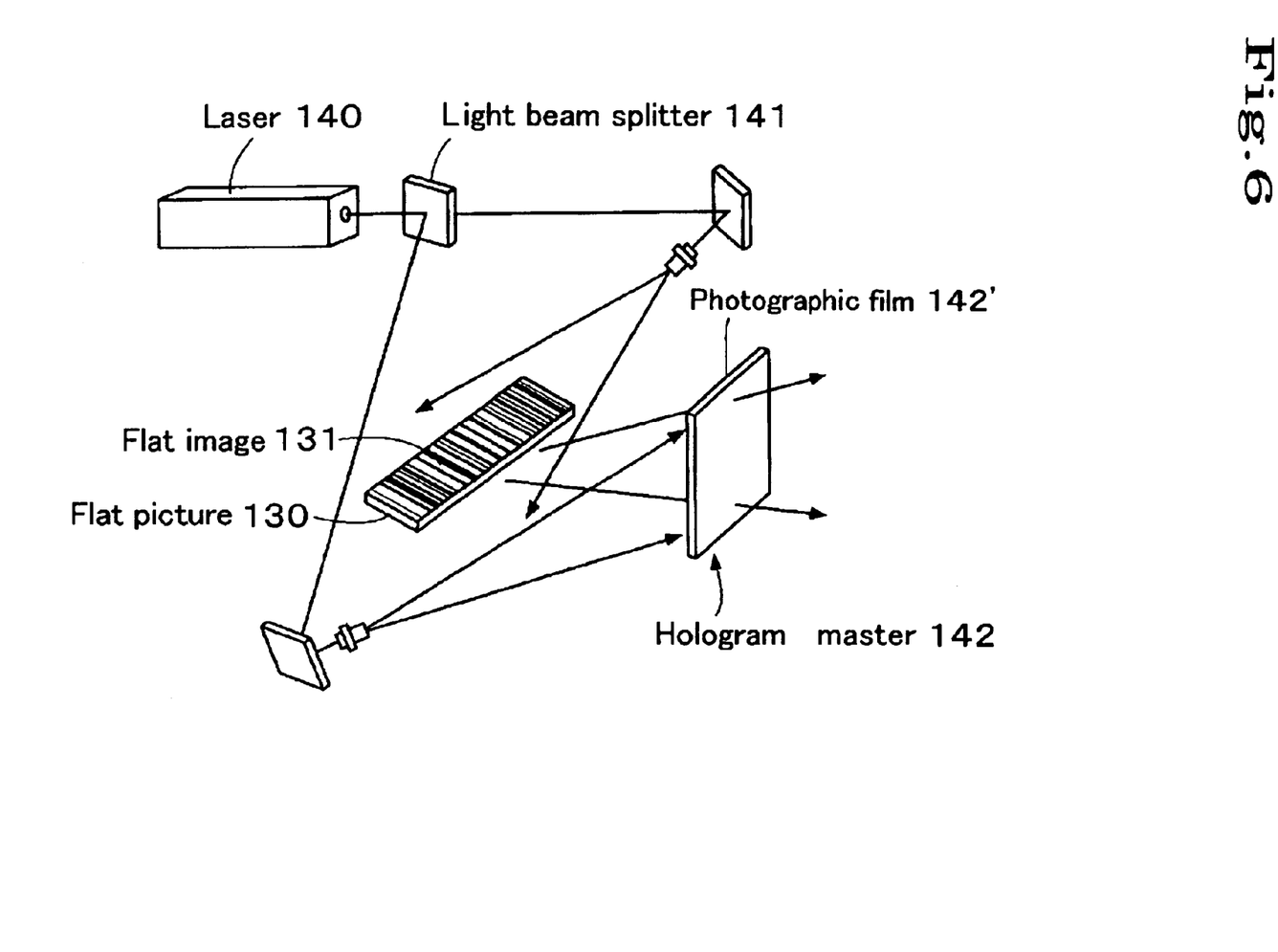
FIG. 6 is a view explaining a master for a hologram.

As described above, a prepaid card added with a hologram is easy in its information management and handling, and has a large forgery/alteration-preventing effect. On the other hand, production of a hologram having a characteristic code is not always easy. Namely, different hologram master plates should be prepared correspondingly to many prepaid cards each having a characteristic code. Using those different hologram master plates, holograms having respective corresponding characteristic codes are produced. To explain this, FIG. 6 is referred to. To produce a hologram master plate, a flat picture 130 expressing a flat image 131 of a characteristic code is prepared first. A laser beam emitted from a laser 140 is divided into two beams by a light beam splitter 141. One beam is used as an object beam and the other as a reference beam. The flat image 131 is irradiated by both beams to photograph the interference fringes of the flat image 131 onto a high resolution photographic film 142'. The photographic film 142' is developed and fixed to produce a hologram master 142. Based on the interference fringes of this hologram master 142, a hologram master plate is produced. A hologram is obtained by transferring this interference fringes of the hologram master plate onto a publicly known conventional material sheet (Details are described in: KUBOTA, Toshihiro, "Introduction to Holography", published by Asakura Shoten, Ltd.).

As described above, when production of hologram master plates and transfer to material sheets are carried out correspondingly to and separately for each of many prepaid cards, prepaid cards become too expensive and impractical.

Present invention provides a method of producing hologram tapes each having a characteristic code, solving the above-mentioned problem.

Next, a conventional example of a method of managing prepaid cards will be described referring to FIG. 8.

It is known that shops join an on-line data management center 202 as a party for commonly using prepaid cards, and prepaid cards issued by this on-line data management center 202 are used commonly for each shop. In that case, many shops joining the on-line data management center 202 are scattered all over the country. And, the on-line data management center 202 is provided with a management center computer 220, and carries out data management of prepaid cards, which have been published by member shops, for each member shop in a batch manner.

A shop A computer 211, a shop B computer 212 and a shop C computer 213 illustrate shop computers of three shops out of the many countrywide scattered member shops joining the on-line data management center. The on-line data management center 202 is provided with the management center computer 220 that has large capacity and operates at a high speed. Those scattered shop computers 211–213 are connected to the management center computer 220 through subscriber lines 231–233 of those shops, a communication line 203, and a subscriber line 221 of the on-line data management center 202.

Each of the shop computer 211–213 daily publishes prepaid cards issued by the on-line data management center, for users, records card data to a prepaid card that accesses to the shop computer in question, and stores and manages a card use history into its own storage unit. Here, as the data, the sales data shown in FIG. 9(a) and the use data shown in FIG. 9(b) are used. Stored contents of card data are shown in FIG. 10, and stored contents of a card use history is shown in FIG. 11. A card use history consists of sales data and use data. It is assumed that thousand card numbers are published per day, giving 0001 through 9999. With respect to a card use history of an unused card published by a shop computer 211–213, only the field of the sales data is filled in the card use history shown in FIG. 11, while the field of the use data is unfilled. As a card is used, the field of the use data in a shop computer is added with entries. Business data including publication of prepaid cards and card use histories is transmitted online from each shop computer 211–213 to the management center computer 220 through the subscriber lines and the communication line as shown by one-dot chain lines, and is separately managed for each shop.

As described above, business data including publication of prepaid cards and utilization states is transmitted from each shop computer 211–213 to the management center computer 220 through the communication line including the subscriber lines, and the on-line data management center separately manages the data for each shop. A prepaid card published by a shop magnetically stores the card data shown in FIG. 10. A prepaid card of 5,000 yen has a balance of 5,000 yen in a state that a card user who has purchased the card has not used the card yet.

When a card user uses a prepaid card having a balance of 5,000 yen, for accessing the shop computer 211 of the shop A, to input 500 yen, then, the shop A computer 211 performs calculation on the card data of the prepaid card in question, recognizes the balance of 5,000 yen, subtracts 500 yen from the balance, and rewrites the balance to 4,500 yen. Further, the shop A computer 211 enters the date of use: 06301040, the paid amount: 500, the publishing shop number: a, and the card number: 001 into the fields of the use data of the card use history stored in the storage unit. It is not necessary to particularly store the balance. When the prepaid card in question is further used by 500 yen in the shop A, similar processing is carried out. Namely, the balance 4,500 yen is recognized from the prepaid card, and the paid amount 500 yen is subtracted from that balance, and the balance of the card data is rewritten to 4,000 yen. Further, the shop A computer 211 enters the date of use: 06301100, the paid amount: 500, the publishing shop number: a, and the card number: 001 into the fields of the use data of the card use history stored in its storage unit.

Next, when this prepaid card accesses the shop B computer 212 to input 1,000 yen, then, the shop B computer 212 performs calculation on the prepaid card in question, recognizes the balance 4,000 yen, subtracts the paid amount 1,000 yen from the balance, and rewrites the balance of the card data into 3,000 yen. The shop B computer 212 stores the card data of the concerned prepaid card, i.e., the publishing shop number: a, the publishing date: 06301030, the publishing value: 5,000, the balance: 3,000, the card number: 001, the paid amount: 1,000 yen into the fields of the sales data and the use data in its own storage unit. The shop B computer 212 transmits online this card data as business data to the management center computer 220. Thereafter, the prepaid card of this card number is similarly used in the shop A or shop C, until the balance becomes 0.

The management center computer 220 of the on-line data management center performs online calculation on the business data transmitted from each shop. Since processing quantity is very large, a computer that has large capacity and operates at a high speed should be prepared as the computer 220, thus making the equipment costs of the on-line data management center too expensive. When on-line processing is carried out, there arise concentration of calls to the management center computer 220 of the on-line data management center 202 from the shop computers 211–213, and this causes increase of communication equipment costs of the on-line data management center 202.

Further, a shop computer 220 is required to hold and manage card use histories of prepaid cards published by that computer. Accordingly, a computer having somewhat larger processing capacity is required as the shop computer 220, increasing equipment costs of each shop.

The present invention provides a method of managing prepaid cards, solving the above-mentioned problems.

SUMMARY OF THE INVENTION

The present invention provides a card having a money payment function, wherein record elements expressing information such as an amount of money, frequency of use, and the like to be written into the card are formed of optical identification members having a specific reflection characteristic that can not be forged, such that the number of the formed and arranged record elements corresponds to a prepaid amount of money. Further, the present invention provides a method of recording money consumption, wherein mechanically damaged marks or optically damaged marks are formed in the formed and arranged record elements, to make those record elements unidentifiable, and to record money consumption by making those mechanically damaged marks or optically damaged marks.

According to the card having a money payment function of the present invention, the information such as the amount of money, the frequency of use, and the like to be written into the card is expressed by the record elements formed of the optical identification members having the specific reflection characteristic that can not be forged. Accordingly, it is impossible to forge those record elements. In other words, not only the card itself can not be forged, but also rewriting of the balance, information of usable remainder recorded on this card, is entirely impossible.

Thus, according to the card and the method of recording money consumption of the present invention, it is impossible to rewrite information recorded on the card, not to say forgery of the card.

It is the object of the invention to provide a method of producing hologram tapes, comprising steps of: preparing an elongate flat image expressing a random number linearly in a form of a bar code; preparing a hologram master of the random number in the form of a bar code, based on the prepared flat image; winding the hologram master around a surface of a drum 110, and applying an etching technique to prepare a drum-shaped hologram master plate 101 formed with a micro relief corresponding to interference fringes on the surface of the drum 110; rotating the drum-shaped hologram master plate 101 on a surface of a long material sheet 120, to repeatedly transfer the micro relief hologram master 111 of the surface of the drum-shaped hologram master plate 101 to the material sheet 120; and cutting the material sheet 120 to which the micro relief hologram master 111 is transferred into hologram tapes each having a specific length.

An even further object of the invention is to provide the method of producing hologram tapes wherein the material sheet 120 is cut into the hologram tapes each having the length that does not exactly divide a circumferential length of the drum-shaped hologram master plate 101.

Another object of the present invention is to provide a method of producing hologram tapes, comprising steps of: preparing an elongate flat image expressing a random number linearly in a form of a bar code; preparing a hologram master of the random number in the form of a bar code, based on the prepared flat image; duplicating the hologram master; winding duplicated hologram masters around a surface of a drum 110, being shifted from one another in a circumferential direction, and applying an etching technique to prepare a drum-shaped hologram master plate 101 formed with rows of micro relief corresponding to interference fringes on the surface of the drum 110; rotating the drum-shaped hologram mater plate 101 on a surface of a long material sheet 120, to transfer the rows of micro relief hologram masters 111 to the material sheet; and cutting the long material sheet 120, to which the micro relief hologram masters 111 are transferred, into hologram tapes each having a specific length.

An even further object of the invention is to provide: the method of producing hologram tapes wherein the material sheet 120 is cut into the hologram tapes each having the length that does not exactly divide a circumferential length of the drum-shaped hologram master plate 101.

Still yet another object of the invention is to have a hologram tape produced.

It is the object of the present invention to produce a prepaid card produced by cutting the hologram tape.

An even further object of the invention is to provide a method of managing prepaid cards, in which data on a prepaid card of a shop that publishes and commonly uses prepaid cards is transmitted to an on-line data management center 202 through a communication line, and the on-line data management center 202 performs data management in a batch manner for each shop, wherein: a shop computer reads card data of a prepaid card that accesses to said shop computer, and inherits data management of a shop computer that managed said prepaid card in a last time through the communication line.

It is the object of the invention to provide the method of managing prepaid cards wherein a managing shop number for identifying a shop computer that manages a card use history of a prepaid card is recorded in said prepaid card and in a storage unit of the shop computer.

It is the further object of the invention to provide the method of managing prepaid cards wherein a shop computer reads card data of a prepaid card that accesses said shop computer, updates a managing shop number recorded in said prepaid card into a managing shop number of said shop computer, and deletes a card use history recorded in a last shop computer through the communication line.

It is the object of the invention to provide the method of managing prepaid cards wherein a shop computer recognizes a managing shop number from card data of a prepaid card that accesses said shop computer, accesses a shop computer of a shop corresponding to a result of recognition through the communication line, to inherit a card use history of said prepaid card into a storage unit of its own shop, deletes the card use history of said prepaid card from a storage unit of the shop computer of the recognized shop, and updates the managing shop number of said prepaid card to the managing shop number of its own shop.

It is a further object of the invention to provid the method of managing prepaid cards wherein a balance in card data of a prepaid card that accesses a shop computer is tested referring to a card use history in a storage unit that has inherited a shop computer of a last shop in which said prepaid card was used.

It is the object of the invention to provide the method of managing prepaid cards wherein a shop computer transmits business data including publishing and utilization states of prepaid cards to a management center computer once a day at a predetermined time.

DETAILED DESCRIPTION OF THE INVENTION

Now, the present invention will be described in detail referring to the attached drawings.

Figure 1:
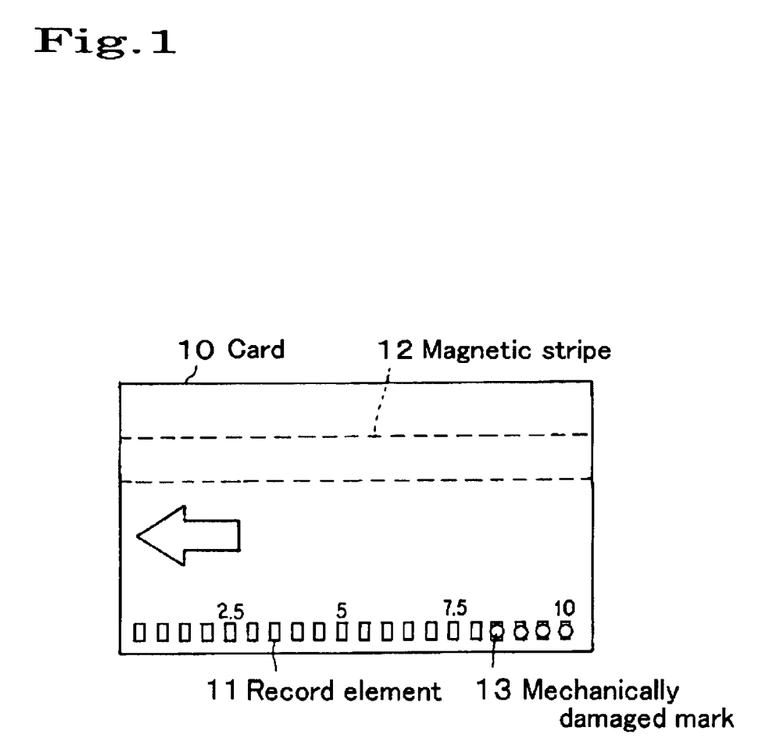
FIG. 1 is a plan view showing an embodiment according to the present invention.

FIG. 1 shows an embodiment of a card having a money paying function according to the present invention. In the figure, the reference numeral 10 refers to a card. A conventional card having any form may be used as this card 10. The reference numeral 11 refers to a record element formed on a surface of this card 10. This record element 11 is formed in a shape of, for example, about 2*3 millimeters, and such record elements 11 are formed in a required number and, for example, along a long side of the card 10. The number of the formation corresponds to the amount of money that a user paid for purchasing the card. The record element 11 is made of an optical identification member utilizing a hologram or a diffraction grating known in the above-mentioned publicly known document or the like. Inside the optical identification member, is illustrated a pattern, a symbol, or the like for identifying the authorized card. This pattern or symbol for identification is read by an optical reading means, to judge if the card is an authorized one or not.

Further, as the optical identification member, may be used an optical record medium for a compact disk called such as CD, or an optical record medium for a write once disk called WORM. When such optical record medium is used, each record element 11 is written in advance with an ID number for identification of a true card or an amount of money assigned to each record element 11 according to the order of its position.

Figure 2:
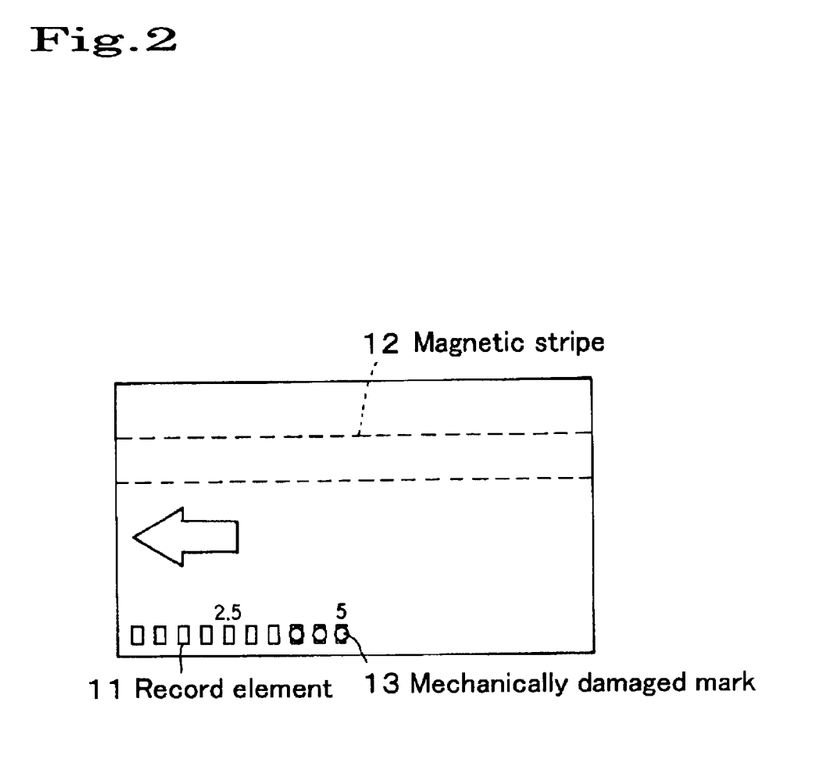
FIG. 2 is a plan view showing a variation according to the present invention.

This embodiment is described assuming a prepaid card used in a pinball house as one embodiment of a mode of using the card. In a pinball house, balls for one game are generally rented for 500 yen. Accordingly, one record element 11 corresponds to the rental value of one-game balls. Several kinds of cards 10 including, for example, a 10,000 yen card, a 5,000 yen card, a 3,000 yen card, etc. are prepared. Thus, each card is formed with record elements 11, the number of which corresponds to the value of the card. In the example shown in FIG. 1, twenty record elements 11 are formed in a 10,000 yen card. FIG. 2 shows a 5,000 yen card formed with ten record elements 11. Along the line of the record elements 11, the numbers 2.5, 5, 7.5, 10 are added for expressing remaining amounts of money. For example, the number 2.5 expresses 2,500 yen. The card 10 is provided with a conventional magnetic stripe 12. The magnetic stripe 12 records the selling date, an identification number expressing the shop that sold the card, and the like.

In the method of recording money consumption according to the present invention, the record elements 11 are formed of identification members, such as holograms, diffraction gratings, or optical record media, having the specific reflection characteristic that can be identified by an optical identification means, and a mechanically damaged mark or an optically damaged mark 13 is formed in a record element 11 to make the record element 11 unidentifiable. In the examples shown in FIGS. 1 and 2, mechanically damaged marks are applied using a punched hole as a mechanically damaged mark 13. When the size of a punched hole is decided to have a diameter that can remove a main identification part of the shape of the record element 11, the record element 11 can be damaged into an unidentifiable state. In the shown examples, mechanically damaged marks 13 are formed from the side of the highest value of the numbers expressing the remaining amounts of money, according to money consumption, so that the indicated value of the remaining amount can be directly read. Here, as another method of damaging the record element 11, the record element 11 may be shaved off.

When the optical record medium is used, a laser beam or the like is used to optically damage the record element 11. When an optically damaged mark can not be observed visually, a punched hole may be provided in an upper position so that the remaining amount can be directly read.

Figure 3:
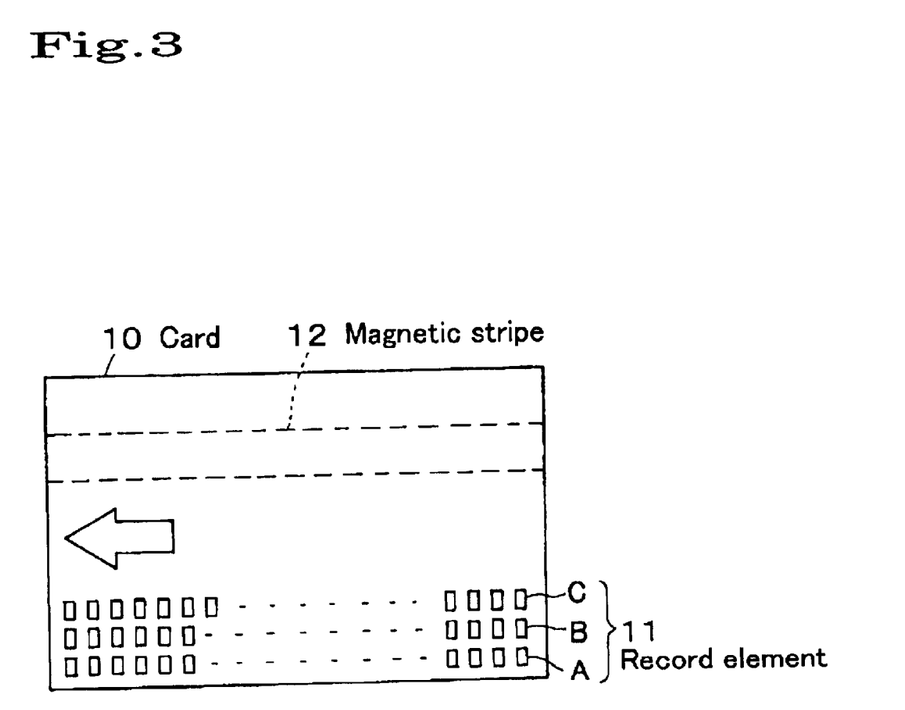
FIG. 3 is a plan view showing another variation according to the present invention.

FIG. 3 shows another embodiment according to the present invention. In this embodiment, a plurality of lines of record elements 11 are provided, and amount of money for each record element has a different value for each line. For example, when 500 yen is allotted to each record element in the line A, 100 yen in the line B, and 10 yen in the line C, it is possible to pay a fraction in 10 yen. As a result, it can be considered that the card is used as a telephone card or as a card for purchasing a passenger ticket.

Figure 4:
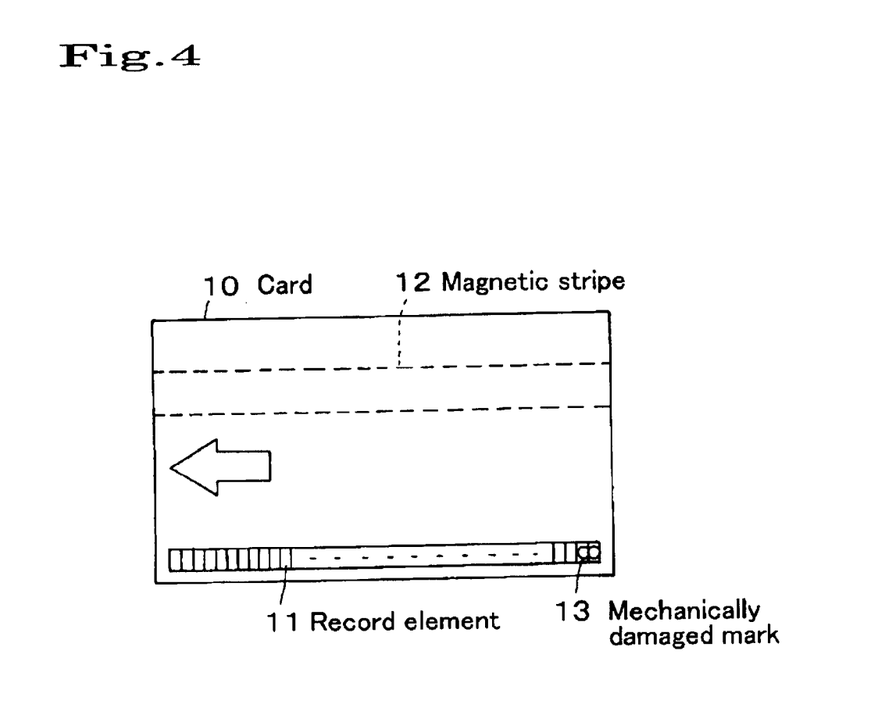
FIG. 4 is a plan view showing still another variation according to the present invention.

In the above embodiments, the record elements 11 are separately formed one by one. However, as shown in FIG. 4, the record elements 11 may be formed continuously. In this case, each part of the record element 11 may be enclosed by a frame by printing, to distinguish each record element 11.

Next, will be described one of the best modes of the method of producing a hologram tape according to the present invention.

Figure 5:
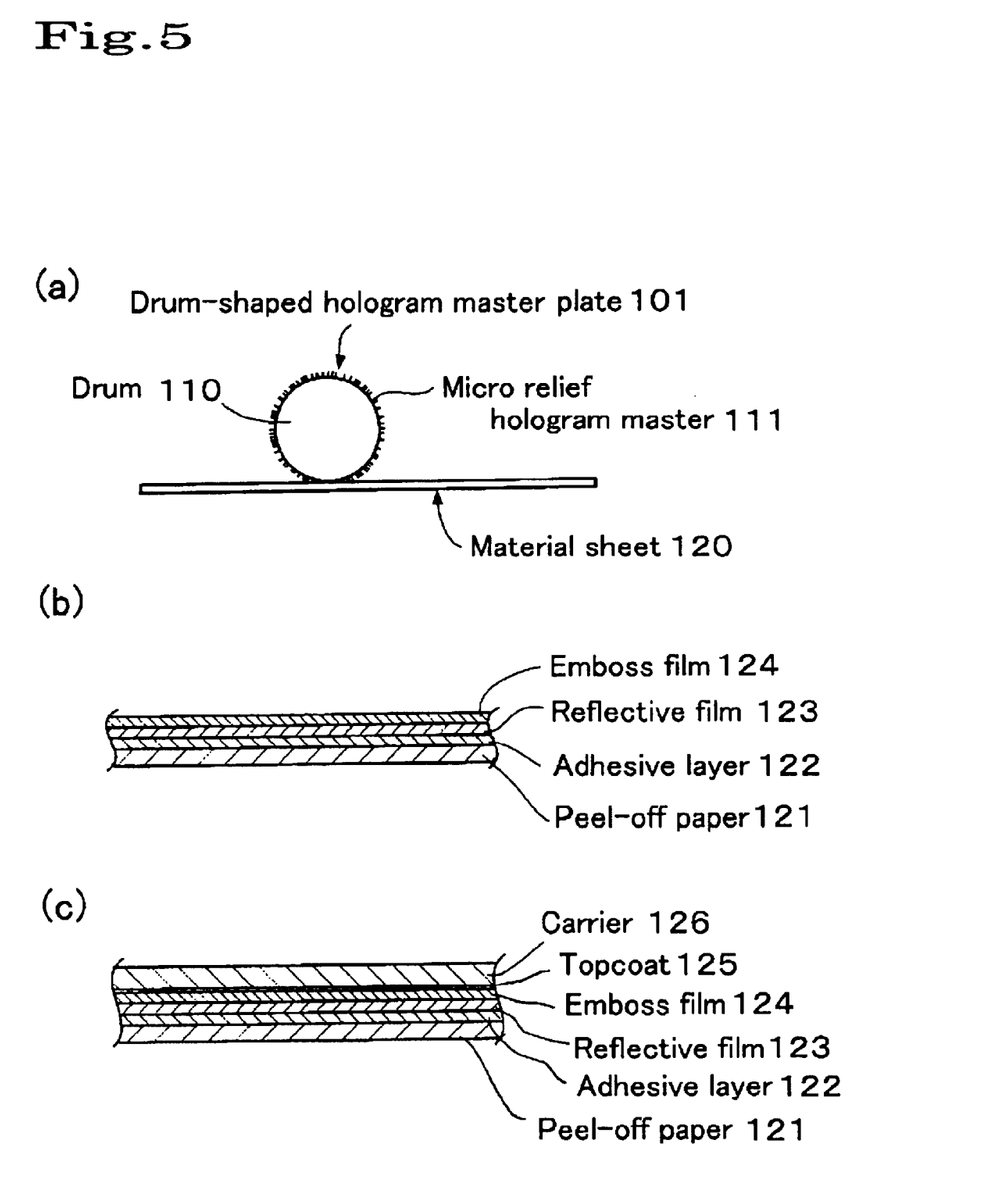
FIG. 5 is a view explaining an embodiment.

FIG. 5(a) is a view explaining production of a hologram tape by applying a drum-shaped hologram master plate to a hologram material sheet, and FIG. 5(b) is a view showing a cross section of the hologram tape.

To produce the drum-shaped hologram master plate 101, a tape-shaped elongate flat image expressing a characteristic code is made, similarly to the conventional examples. This flat image uses a random number as the characteristic code and expresses it linearly in the form of a bar code. Then, a laser beam is divided into two beams, to use one as an object beam and the other as a reference beam. Both beams are applied to the linearly-expressed flat image in the bar code form, to photograph it in the form of interference fringes into non-exposed high resolution photographic film. Then, the film is subject to a developing process, to produce a hologram master having a random number characteristic code in the form of a bar code. Based on the interference fringes of the hologram master, the drum-shaped hologram master plate 101 of the present invention is formed on its surface with micro relief corresponding to the interference fringes. In the following, will be described a method of forming the extremely fine relief, which corresponds to the interference fringes of the hologram master, on the surface of a drum 110.

A drum 110 having a perfect circle cross section is prepared, and high resolution sensitive emulsion film is formed by deposition all over the surface of the drum 110. Next, the surface of this drum 110 is wound with the tape-shaped elongate hologram master that has been prepared previously. Then, the sensitive emulsion film is exposed through this hologram master, to print the interference fringes of the hologram master. Then, the surface of the drum that has been printed with the interference fringes of the hologram master is etched to produce the drum-shaped hologram master plate 110. The drum-shaped hologram master plate 101 is designed and produced such that the circumferential length of the surface of the drum 110 is equal to the total length of the hologram master. As a result, the drum-shaped hologram master plate 101 is formed with the random number characteristic code in the form of a gapless bar code along the circumferential direction.

Now, a method of producing a hologram tape will be described.

For producing a hologram tape, a long material sheet 120 is prepared. The material sheet 120 comprises a bottom layer of peel-off paper 121, an adhesive layer 122 formed on the upper surface of the peel-off paper 121, a reflective film 123 formed by vapor deposition on the upper surface of the adhesive layer 122, and an emboss film 124 formed by vapor deposition on the upper surface of the reflective film 123. Each the reflective film 123 and emboss film 124 is formed as a thin film by deposition of metallic material or metallic oxide material, and has sufficient optical transparency. Further, a topcoat 125 and a carrier 126 are formed later to protect the emboss film 124.

The surface of the drum-shaped hologram master plate 101 is formed with the micro relief hologram master 111. Accordingly, by rotating the drum-shaped hologram master plate 101 on the surface of the long material sheet 120, the micro relief hologram master 111 is embossed and transferred to the emboss film 124 of the material sheet 120, forming the random number characteristic code in the form of a gapless bar code. The micro relief hologram master 111 on the surface of the drum-shaped hologram master plate 101 is repeatedly transferred to the long material sheet 120 to the end of the sheet length. Here, the topcoat 125 and the carrier 126 are formed after the transfer.

According to the present invention, when the material sheet 120 are cut into tapes of the specific length that does not exactly divide the circumferential length of the drum-shaped hologram master plate, one hologram master plate can produce many hologram tapes each having different characteristic code. In the following, description will be given employing numerical examples.

It is assumed that the circumferential length of the drum-shaped hologram master plate 101 is 80 cm, and the specific length of a hologram tape to attach to a prepaid card is 7 cm. Namely, in relation to the circumferential length of 80 cm of the drum-shaped hologram master plate 101, the material sheet 120 is cut into pieces of the specific length of 7 cm that does not exactly divide 80 cm. When the drum-shaped hologram master plate 101 having the circumferential length of 80 cm makes one rotation, the material sheet 120 of 80 cm is formed, which can not be exactly divided by 7 cm. Noting the boundary between the end of the first rotation of the drum-shaped hologram master plate 101 and the starting end of its second rotation, the material sheet 120 of 80 cm formed by the first rotation is short by 4 cm for taking 12 pieces of hologram tapes of 7 cm from the material sheet 120 by cutting it. However, going up to 4 cm into the material sheet 120 of 80 cm formed by the second successive rotation, 12 pieces of hologram tapes can be obtained. With respect to the material sheet 120 formed by the second rotation, the first hologram tape is cut, with its starting point being spaced 4 cm apart from the starting end of the second rotation. Since this first hologram tape of 7 cm, whose cutting is measured from the position spaced 4 cm apart from the starting end of the second rotation, is different in its starting point from the first hologram tape that is cut from the material sheet 120 formed by the first rotation, those tapes have different characteristic codes from each other. With respect to the material sheet 120 formed by third rotation, the first hologram tape is cut with its starting point being spaced 8 cm apart from the starting end of the third rotation. Thus, the origin of the cutting is spaced 8 cm apart from the starting end, and is different, of course, from the starting end itself and from the point spaced 4 cm apart from the starting point. Accordingly, the first hologram tape obtained from the material sheet 120 formed by the third rotation has different characteristic code from both the previously mentioned first hologram tapes, also. After this and up to the material sheet 120 formed by the 20th rotation, the origin of cutting of a first hologram tape is different from any of the previous first hologram tapes, and accordingly, its characteristic code also is different from the characteristic codes of those previous tapes. Also, with respect to second hologram tapes, their starting points are different from one another, and accordingly, every second hologram tape has a different characteristic code from the others. The same can be said with respect to third and following hologram tapes. In this example, when the drum-shaped hologram master plate 101 is rotated twenty times, the initial state of ration is restored, which means that one drum-shaped hologram master plate 101 is used equivalently to twenty different drum-shaped hologram master plates. After all, this embodiment obtains 240 hologram tapes of 7 cm, each having a different characteristic code from the others.

In the above embodiment, only one tape-shaped elongate hologram master is wound around the surface of the drum 110, to produce the drum-shaped hologram master plate 101 formed with a row of micro relief hologram master. Here, when a tape-shaped elongate hologram master is duplicated, and rows of duplicated hologram masters are wound around the surface of the drum 110 parallel to each other, being shifted from one another in the circumferential direction, a drum-shaped hologram master plate 101 formed with rows of micro relief hologram masters is produced. By winding a micro relief hologram master consisting of a plurality of same hologram masters circumferentially shifted from each other around the surface of the drum 110, by applying the etching technology to produce the drum-shaped hologram master plate 101 formed with rows of micro reliefs corresponding to interference fringes, and by rotating this drum-shaped hologram master plate 101 on the surface of a long material sheet 120, rows of different micro relief hologram masters 111 are embossed and transferred to the emboss film 124 of the material sheet 120, forming random number characteristic codes in the form of gapless bar codes. The micro relief hologram master 111 on the surface of the drum-shaped hologram master plate 101 is repeatedly transferred to the long material sheet 120 to the end of the sheet length.

As described above, many pieces of hologram tapes can be produced at once by preparing a row of a tape-shaped elongate flat image expressing a characteristic code, by making a row of hologram master based on this image, by duplicating this hologram master, by producing the drum-shaped hologram master plate 101 formed with rows of micro relief hologram masters on its surface, by using this hologram master plate 101 to transfer the micro relief hologram masters onto the long material sheet 120, and by cutting this long material sheet 120 into pieces of the specific length. Further, by cutting the hologram material sheet, which has been produced by one hologram master plate, into pieces each having the specific length required for a prepaid card, hologram tapes that have different characteristic codes from one another and correspond to many prepaid cards can be produced.

Next, one of the best modes of the method of managing prepaid cards according to the present invention will be described referring to FIG. 7. In this embodiment, members common to the conventional example have common reference numerals.

In the conventional example, shop computers 211–213 of respective shops each perform data exchange with the management center computer 220 of the on-line data management center 202, being connected through the communication line 203. However, the shops have no relation to one another, and each shop is independent not performing data exchange with the other shops. On the other hand, according to the present invention, the shop computer 211–213 of each shop not only performs data exchange with the management center computer 220 of the on-line data management center 202 being connected through the communication line 203, but also performs data exchange with one another between the shops, as shown by one-dot chain lines.

Each of the shop computers 211–213 daily publishes prepaid cards issued by the on-line data management center 202, records card data onto a prepaid card used by accessing the computer, and stores and manages a use history of this prepaid card in a storage unit provided to the computer. Business data including publication and utilization states of prepaid cards is sent by each shop computer 211–213 to the management center computer 220 of the on-line data management center 202 through the communication line 203, once a day at a predetermined time. The management center computer 220 calculates and aggregates the data to obtain accurate total sales for each shop.

In this embodiment, a prepaid card is provided with a managing shop number in the form of magnetic data, in addition to the above-mentioned card data. This managing shop number indicates a shop computer of a shop in which the prepaid card is used in the last, meaning that prepaid card is managed by the shop of the managing shop number. In publishing a prepaid card, each shop records a managing shop number in the form of magnetic data into the prepaid card published.

When a 5,000 yen prepaid card is published and recorded with the above-mentioned card data by the shop A, the managing shop number a of the A shop is recorded in the card. In a state that a card user who purchased the card has not used the card, the unused balance is 5,000 yen. The use history of this card is recorded in a storage unit of the shop A computer 211.

When the card user accesses the shop A computer 211 using the prepaid card having the balance of 5,000 yen, to input 500 yen, then, the shop A computer 211 reads the card data of that prepaid card to recognize the managing shop number a. Thus, the shop A computer 211 recognizes that the shop A manages the prepaid card in question. Then, the shop A computer 211 performs calculation of that prepaid card, reads the balance from the card data, and, at the same time, refers to the balance held in the card use history in the storage unit of the shop A, which is the managing shop of that prepaid card, through the communication line, to test the balance of the prepaid card. The result of the test is valid, and then, the recognized balance 5,000 yen is compared with the input amount 500 yen, to find that the balance is larger than the input amount. Then, the balance 4,500 yen obtained by subtracting the paid amount 500 yen is recorded into the prepaid card in question. The shop A computer 211 rewrite the balance of that prepaid card from 5,000 yen to 4,500 yen, and adds use data of the paid amount 500 yen to the card use history in the storage unit of the shop A computer 211. When that prepaid card is further used for inputting 500 yen at the shop A, the shop A computer 211 performs the similar operation, further adds the use data of the paid amount 500 yen of this time to the card use history, and rewrites the balance of the prepaid card to 4,000 yen.

When the above-mentioned prepaid card is used for accessing the shop computer 212 of the shop B to input 1,000 yen, then, the shop B computer 212 reads the card data of the prepaid card, recognizes the managing shop number a, and recognizes that the shop A has managed the prepaid card immediately before. Based on this recognition result, the shop B computer 212 accesses the shop computer 211 of the shop A, which has managed the prepaid card immediately before, through the communication line, to inherit the card use history of that prepaid card, and to update the managing shop number a into the managing shop number b of its own. By this inheriting, the data on the prepaid card in question is entirely deleted from the storage unit of the shop computer 211 of the shop A. Similarly to the above, the shop B computer 212 performs calculation on the prepaid card in question, reads the balance, and refers to the card use history in the storage unit that inherits the data from the shop A, to test the balance of the prepaid card. The result of the test is valid, and the recognized balance is 4, 000 yen, from which the paid amount 1,000 yen is subtracted. The use data of the paid amount 1,000 of this time is added to the card use history in the storage unit of the shop B computer 212, and the balance of this prepaid card is rewritten to 3,000 yen. Thereafter, the prepaid card of this card number is similarly used in the shop A or shop C, until the balance becomes 0.

An altered prepaid card may be used, by rewriting the balance held in the card data. In that case, when that prepaid accesses a shop computer, the balance of that prepaid card is first tested by referring to the use data in the card use history stored in the storage unit that has inherited the data from the last shop where the card has been used, including the storage unit of the shop that published that prepaid card. Based on the test result, forgery by rewriting of the balance can be exposed.

Symbols used in the drawings are listed as follows.
10 card
11 record element
12 magnetic stripe
13 mechanically damaged mark
101 drum-shaped hologram master plate
110 drum
111 micro relief hologram master
120 material sheet
121 peel-off paper
122 adhesive layer
123 reflective film
124 emboss film
125 topcoat
126 carrier
130 flat picture
131 flat image
140 laser
141 light beam splitter
142 hologram master
142' photographic film
202 on-line data management center
203 communication line
211 shop A computer
212 shop B computer
213 shop C computer
220 management center computer
221 management center subscriber line
231 shop A subscriber line
232 shop B subscriber line
233 shop C subscriber line

INDUSTRIAL APPLICABILITY

As described above, according to the card having a money payment function and the method of recording money consumption of the present invention, the record elements 11 for recording the amount of money are each made of an identification member that can be hardly forged such as a hologram or a diffraction grating. Accordingly, to say nothing of forgery of the card, rewriting of information is entirely impossible. Thus, the present invention largely contributes to support the social order.

Further, according to the method of producing a hologram tape having a characteristic code of the present invention, it is possible to produce a long hologram material sheet without a gap, to which a micro relief hologram master is transferred. Thus, waste discard of an unused hologram part can be omitted, decreasing production costs of hologram tapes. Further, by cutting the hologram material sheet produced by one hologram master plate into pieces each having the specific length required for a prepaid card, hologram tapes that have different characteristic codes from one another and correspond to many prepaid cards can be produced.

Further, according to the method of managing prepaid cards of the present invention, business data including publishing and utilization states of prepaid cards is transmitted from each shop computer to the management center computer through its subscriber line, the communication line, and the subscriber line of the on-line data management center, once a day at a predetermined time. The management center computer calculates and aggregates the transmitted data, to obtain accurate total sales for each shop. In other words, the management center computer performs mainly batch processing, and quantity of on-line processing becomes smaller. Thus, as the management center computer, may be used a computer having smaller performance, and equipment costs of the entire on-line data management center can be suppressed to be smaller.

Further, quantity of on-line processing of other business data transmitted from each shop computer to the management center computer becomes smaller, and thus telephone communication costs between a shop and the on-line data management center can be reduced.

Further, data exchange at the time of processing usual use of a prepaid card is performed inside a shop or between shops, without performing data exchange with the on-line data management center. Thus, it is possible to avoid concentration of calls to the on-line data management center. This can largely reduce communication equipment costs for the on-line data management center.

Further, a card use history of a prepaid card is inherited to a shop computer to which that prepaid card accesses. As a result, data exchange between shops does not concentrate in a shop computer of a specific shop, and thus, equipment costs of each shop can be suppressed to a lower level.

Further, when a prepaid card accesses a shop computer, the card use history of that prepaid card is inherited from the shop computer of the shop in which the prepaid card has been used in the last. This card use history is referred to, for testing the card use history of the concerned prepaid card itself. As a result, forgery by rewriting of the balance can be exposed.

DRAWINGS

Figure 7:
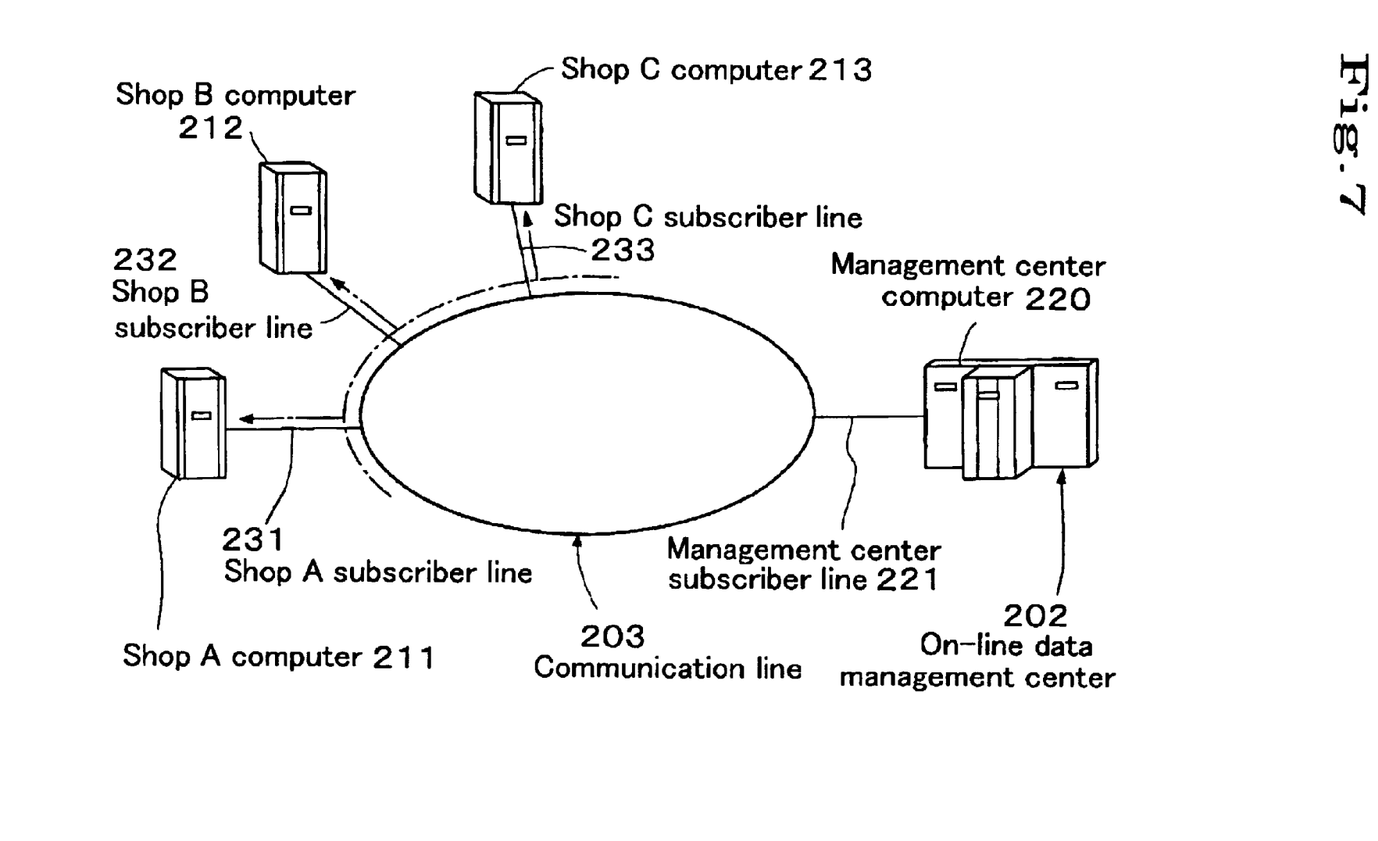
FIG. 7 is a diagram explaining an embodiment.
Figure 8:
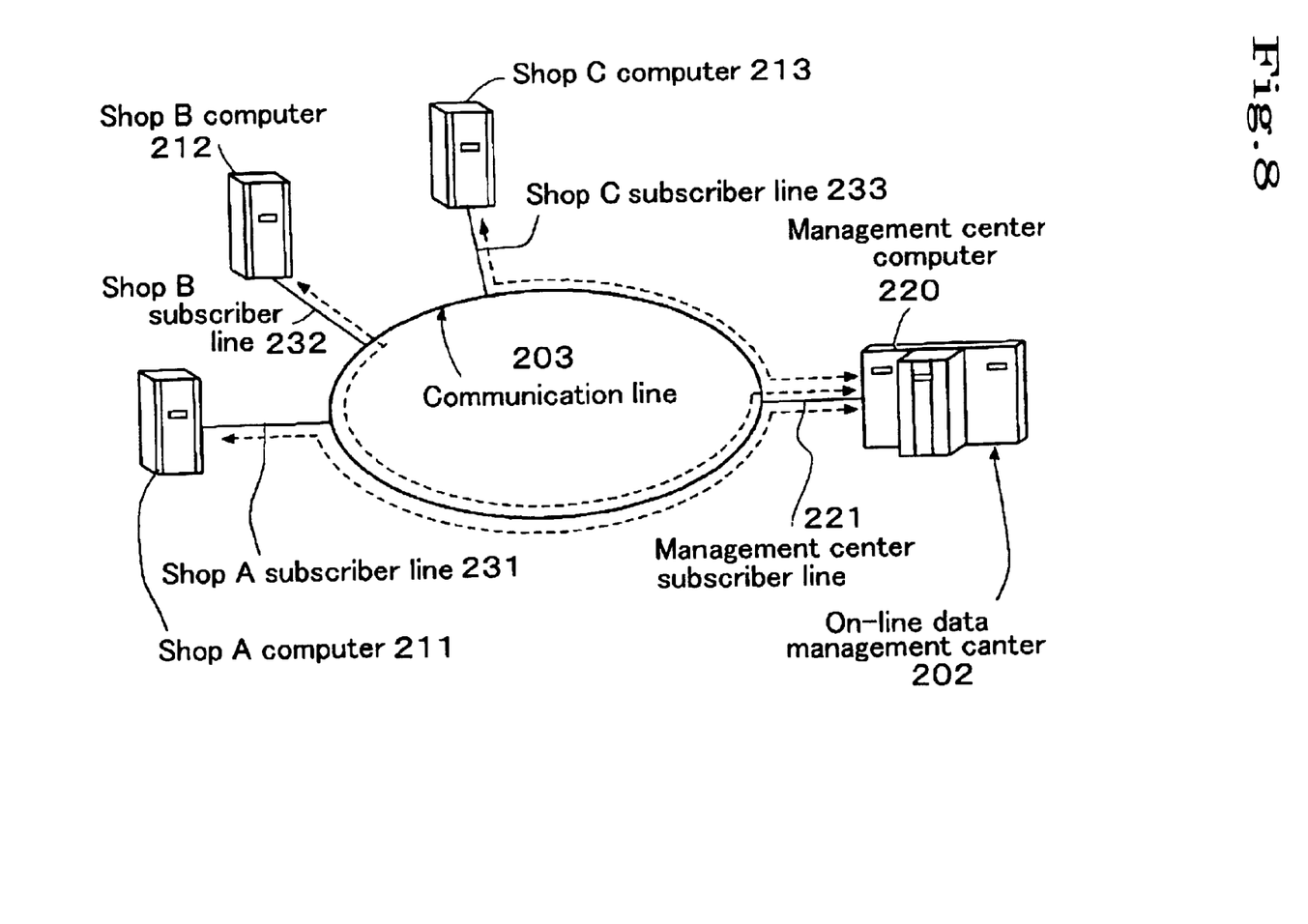
FIG. 8 is a diagram explaining a conventional example.
Figure 9:
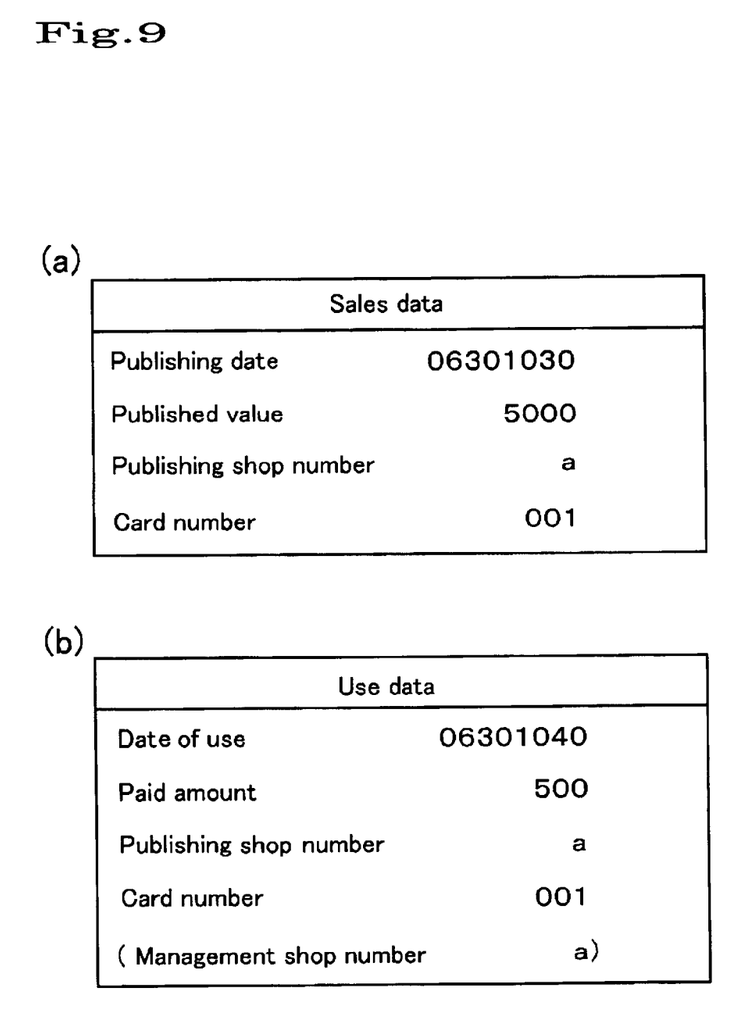
FIG. 9 is a diagram explaining sales data and use data.
Figure 10:
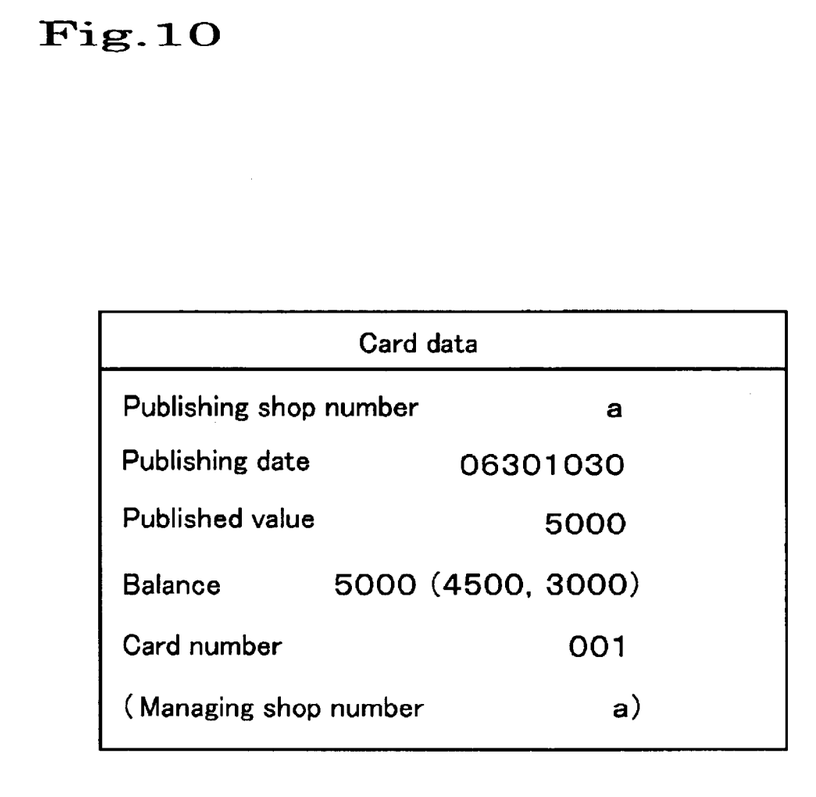
FIG. 10 is a diagram explaining card data.
Figure 11:
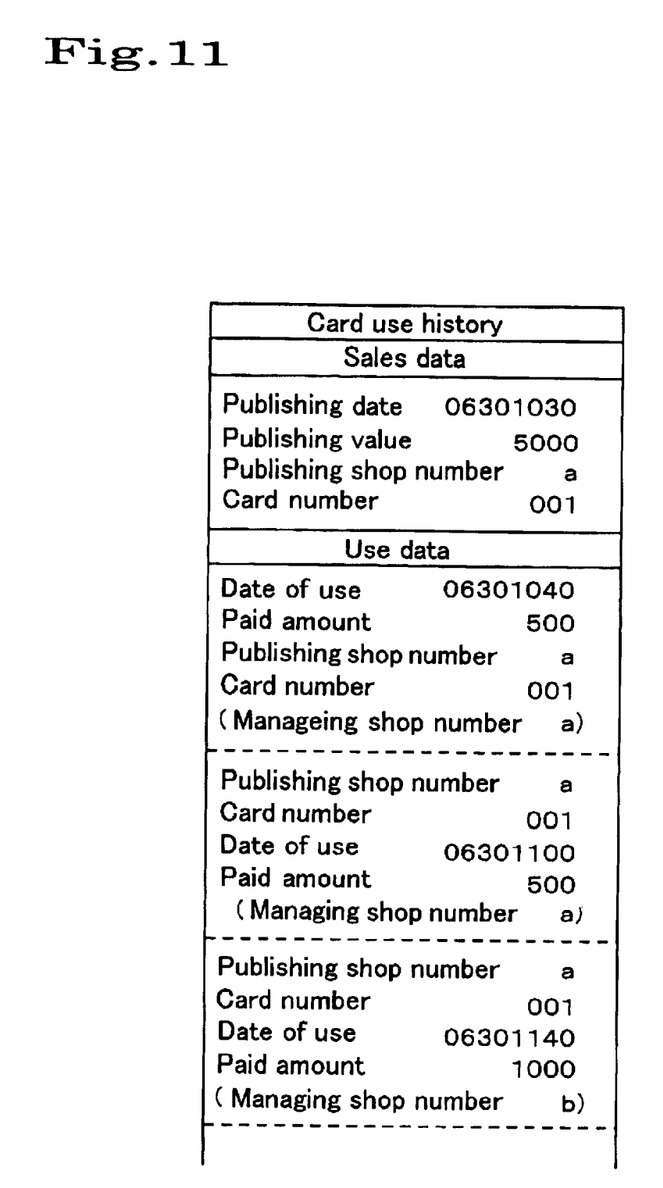
FIG. 11 is a diagram explaining card use history.

FIG. 1
10 Card
12 Magnetic stripe
11 Record element
13 Mechanically damaged mark
FIG. 2
12 Magnetic stripe
11 Record element
13 Mechanically damaged mark
FIG. 3
10 Card
12 Magnetic stripe
11 Record element
FIG. 4
10 Card
12 Magnetic stripe
11 Record element
13 Mechanically damaged mark
FIG. 5
101 Drum-shaped hologram master plate
110 Drum
111 Micro relief hologram master
120 Material sheet
124 Emboss film
123 Reflective film
122 Adhesive layer
121 Peel-off paper
126 Carrier
125 Topcoat
124 Emboss film
123 Reflective film
122 Adhesive layer
121 Peel-off paper
FIG. 6
140 Laser
141 Light beam splitter
142' Photographic film
142 Hologram master
131 Flat image
130 Flat picture
FIG. 7
202 On-line data management center
203 Communication line
211 Shop A computer
212 Shop B computer
213 Shop C computer
220 Management center computer
221 Management center subscriber line
231 Shop A subscriber line
232 Shop B subscriber line
233 Shop C subscriber line
FIG. 8
202 On-line data management center
203 Communication line
211 Shop A computer
212 Shop B computer
213 Shop C computer
220 Management center computer
221 Management center subscriber line
231 Shop A subscriber line
232 Shop B subscriber line
233 Shop C subscriber line
FIG. 9
Sales data
Publishing date
Published value
Publishing shop number
Card number
Use data
Date of use
Paid amount
Publishing shop number
Card number
Managing shop number
FIG. 10
Card data
Publishing shop number
Publishing date
Published value
Balance
Card number
Managing shop number
FIG. 11
Card use history
Sales data
Publishing date
Publishing value
Publishing shop number
Card number
Use data
Date of use
Paid amount
Publishing shop number
Card number
Managing shop number
Publishing shop number
Card number
Date of use
Paid amount
Managing shop number
Publishing shop number
Card number
Date of use
Paid amount
Managing shop number

What is claimed is:

1. A method of producing a hologram, comprising steps of:

preparing an elongate flat image expressing a random number linearly in a form of a bar code;

preparing a hologram master of the random number in the form of a bar code, based on the prepared flat image;

winding the hologram master around a surface of a drum, and applying an etching technique to prepare a drum-shaped hologram master plate formed with a micro relief corresponding to interference fringes on the surface of the drum;

rotating the drum-shaped hologram master plate on a surface of a long material sheet, to repeatedly transfer the micro relief hologram master of the surface of the drum-shaped hologram master plate to the material sheet; and cutting the material sheet to which the micro relief hologram master is transferred into hologram tapes each having a specific length; and wherein, the material sheet is cut into the hologram tapes each having the length that does not exactly divide a circumferential length of the drum-shaped hologram master plate.

2. A method of producing hologram tapes, comprising steps of:

preparing an elongate flat image expressing a random number linearly in a form of a bar code;

preparing a hologram master of the random number in the form of a bar code, based on the prepared flat image;

duplicating the hologram master;

winding duplicated hologram masters around a surface of a drum, being shifted from one another in a circumferential direction, and applying an etching technique to prepare a drum-shaped hologram master plate formed with rows of micro relief corresponding to interference fringes on the surface of the drum;

rotating the drum-shaped hologram master plate on a surface of a long material sheet, to transfer the rows of micro relief hologram masters to the material sheet; and cutting the long material sheet, to which the micro relief hologram masters are transferred, into hologram tapes each having a specific length.

3. The method of producing hologram tapes according to claim 2, wherein:

the material sheet is cut into the hologram tapes each having the length that does not exactly divide a circumferential length of the drum-shaped hologram master plate.

* * * * *